(12) United States Patent
Liao et al.

(10) Patent No.: US 11,140,675 B2
(45) Date of Patent: Oct. 5, 2021

(54) METHODS OF EFFICIENT BANDWIDTH PART SWITCHING IN CARRIER AGGREGATION

(71) Applicant: MEDIATEK INC., Hsin-Chu (TW)

(72) Inventors: Pei-Kai Liao, Hsin-Chu (TW); Wei-De Wu, Hsin-Chu (TW); Jia-Hong Syu, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 198 days.

(21) Appl. No.: 16/578,945

(22) Filed: Sep. 23, 2019

(65) Prior Publication Data

US 2020/0107308 A1 Apr. 2, 2020

Related U.S. Application Data

(60) Provisional application No. 62/738,063, filed on Sep. 28, 2018, provisional application No. 62/737,225, filed on Sep. 27, 2018.

(51) Int. Cl.
*H04W 72/04* (2009.01)
*H04W 72/12* (2009.01)

(52) U.S. Cl.
CPC ....... *H04W 72/044* (2013.01); *H04W 72/042* (2013.01); *H04W 72/1205* (2013.01)

(58) Field of Classification Search
CPC ...... G06F 9/4881; G06F 9/5011; H04J 11/00; H04J 13/00; H04L 5/001; H04L 5/0042; H04L 5/0094; H04W 4/08; H04W 16/14; H04W 16/28; H04W 28/14; H04W 36/0094; H04W 52/34; H04W 72/042; H04W 72/044; H04W 72/0446–0473;
(Continued)

(56) References Cited

U.S. PATENT DOCUMENTS 10,880,949 B2 * 12/2020 Zhou ................. H04W 72/0453
10,887,073 B2 * 1/2021 Zhou .................. H04W 72/042
(Continued)

FOREIGN PATENT DOCUMENTS

CN 102271401 A 12/2011
WO WO2018143727 A1 8/2018

OTHER PUBLICATIONS

International Search Report and Written Opinion of International Search Authority for PCT/CN2019/108374 dated Dec. 27, 2019 (8 pages).
(Continued)

*Primary Examiner* — Thomas R Cairns
(74) *Attorney, Agent, or Firm* — Imperium patent works LLP; Zheng Jin

(57) ABSTRACT

A method of supporting active bandwidth part (BWP) switching under carrier aggregation (CA) is proposed. To avoid longer switching delay and multiple interruptions in other component carriers (CCs)/cells, the starting time of the later active BWP switching in one cell should fall outside the switching delay of the earlier active BWP switching in another cell. If the later active BWP switching is DCI-based, then the network should schedule the later active BWP switching outside the switching delay of the earlier active BWP switching. If the later active BWP switching is timer-based, then the UE should not perform the later active BWP switching until the earlier active BWP switching is completed.

20 Claims, 5 Drawing Sheets

(58) Field of Classification Search
CPC ......... H04W 72/0453; H04W 72/1205; H04W 72/121–1226; H04W 72/1252; H04W 88/06; H04W 88/10
See application file for complete search history.

(56) References Cited

U.S. PATENT DOCUMENTS

2018/0220345 A1    8/2018  Moon et al.
2019/0141695 A1*   5/2019  Babaei ................. H04L 5/0057

OTHER PUBLICATIONS

R4-1808836 3GPP TSG-RAN WG4 Meeting #AH1807, MediaTek Inc.,, "BWP Switching Delay", Montreal, Canada, Jul. 2-6, 2018 (6 pages) *sections 2-4*.
R4-1800419 3GPP TSG-RAN WG4 Meeting AH-1801, Huawei et al., "On SWP switching time", San Diego, USA, Jan. 22-26, 2018 (4 pages).

* cited by examiner

Case 1

Case 4

Case 2

Case 5

Case 3

Case 6

▨ Minimal active BWP switching delay

■ Interruption time due to active BWP switching in other cell

▓ Additional switching delay due to a larger time offset value in BWP switching DCI ⋯ Extended switching delay outside the time offset value in BWP switching DCI

METHODS OF EFFICIENT BANDWIDTH PART SWITCHING IN CARRIER AGGREGATION

CROSS REFERENCE TO RELATED APPLICATIONS

This application claims priority under 35 U.S.C. § 119 from U.S. Provisional Application No. 62/737,225, entitled "Methods of efficient Bandwidth Part Switching in Carrier Aggregation," filed on Sep. 27, 2018; U.S. Provisional Application No. 62/738,063, entitled "Methods of efficient Bandwidth Part Switching in Carrier Aggregation," filed on Sep. 28, 2018, the subject matter of which is incorporated herein by reference.

TECHNICAL FIELD

The disclosed embodiments relate generally to wireless network communications, and, more particularly, to bandwidth part (BWP) switching with carrier aggregation in 5G new radio (NR) wireless communications systems.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition.

The bandwidth shortage increasingly experienced by mobile carriers has motivated the exploration of the under-utilized Millimeter Wave (mmWave) frequency spectrum around 30 G and 300 G Hz for the next generation 5G broadband cellular communication networks. The available spectrum of mmWave band is two hundred times greater than the conventional cellular system. The mmWave wireless network uses directional communications with narrow beams and can support multi-gigabit data rate. 5G new radio (NR) beamforming wireless systems support UEs operating with single wideband carrier and UEs operating with intra-band carrier aggregation over the same contiguous spectrum simultaneously.

Furthermore, to save power, NR introduces the concept of bandwidth part (BWP), which consist of a continuous range of physical resource blocks (PRBs) in frequency domain and whose occupied bandwidth is the subset of the bandwidth of the associated carrier. That is, the bandwidth of a BWP in a carrier is the subset of the carrier bandwidth, where the carrier bandwidth is divided into multiple continuous frequency band with a smaller bandwidth. UE can be configured by the network with several uplink (UL) BWPs and downlink (DL) BWPs, and UE is required to monitor at most one uplink BWP and downlink BWP at the same time. The downlink BWP and uplink BWP which is being used or monitored by the UE is called active BWP, e.g. active DL BWP and active UL BWP respectively. As a result, power consumption to monitor the downlink can be reduced because UE is only required to monitoring the smaller frequency range of the active BWP, rather than monitor the whole carrier bandwidth. Each uplink bandwidth part and downlink bandwidth part have their own identifier, i.e. a BWP ID. In FDD system (i.e., a paired spectrum system), UE can be operated in an active UL BWP and active DL BWP with different BWP ID (e.g. using UL BWP #1 and DL BWP 2); while for TDD system (i.e., an unpaired spectrum system), UE is always operated on a UL BWP and an DL BWP with the same BWP ID.

Under carrier aggregation, for each UE-specific serving cell, one or more DL BWPs and one or more UL BWPs can be configured by dedicated signaling for a UE. There is at most one active DL BWP and at most one active UL BWP at a given time for a serving cell for each UE. The activation or deactivation of BWPs can be achieved by radio resource control (RRC) signaling, downlink control information (DCI) scheduling with explicit indication, or a timer for a UE to switch its active DL BWP to a default DL BWP. The BWP switching delay involves RF setting updates for bandwidth and frequency location change of all activated cells. When the switching delay of more than one active BWP switching overlaps in time domain across cells, the switching delay of an earlier active BWP switching in one cell may be extended due to a later active BWP switching in another cell.

UE behavior during the transition time of a DCI-based or timer-based active BWP switching in BWP operation under carrier aggregation needs to be defined to avoid longer switching delay.

SUMMARY

A method of supporting active bandwidth part (BWP) switching under carrier aggregation (CA) is proposed. To avoid longer switching delay and multiple interruptions in other component carriers (CCs)/cells, the starting time of the later active BWP switching in one cell should fall outside the switching delay of the earlier active BWP switching in another cell. If the later active BWP switching is DCI-based, then the network should schedule the later active BWP switching outside the switching delay of the earlier active BWP switching. If the later active BWP switching is timer-based, then the UE should not perform the later active BWP switching until the earlier active BWP switching is completed.

In one embodiment, a UE receives configuration information transmitted from a base station in a wireless communications network. The UE operates over multiple component carriers (CCs) under carrier aggregation, and the UE is configured with multiple bandwidth parts (BWPs) in each CC. The UE performs a first active BWP switching in a first CC by the UE upon satisfying a first BWP switch trigger condition. The UE detects a second BWP switch trigger condition is satisfied for triggering a second active BWP switching in a second CC. The UE determines a time duration of the first active BWP switching in the first CC, wherein the UE is refrained from performing the second active BWP switching when the second BWP switching is triggered during the time duration.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
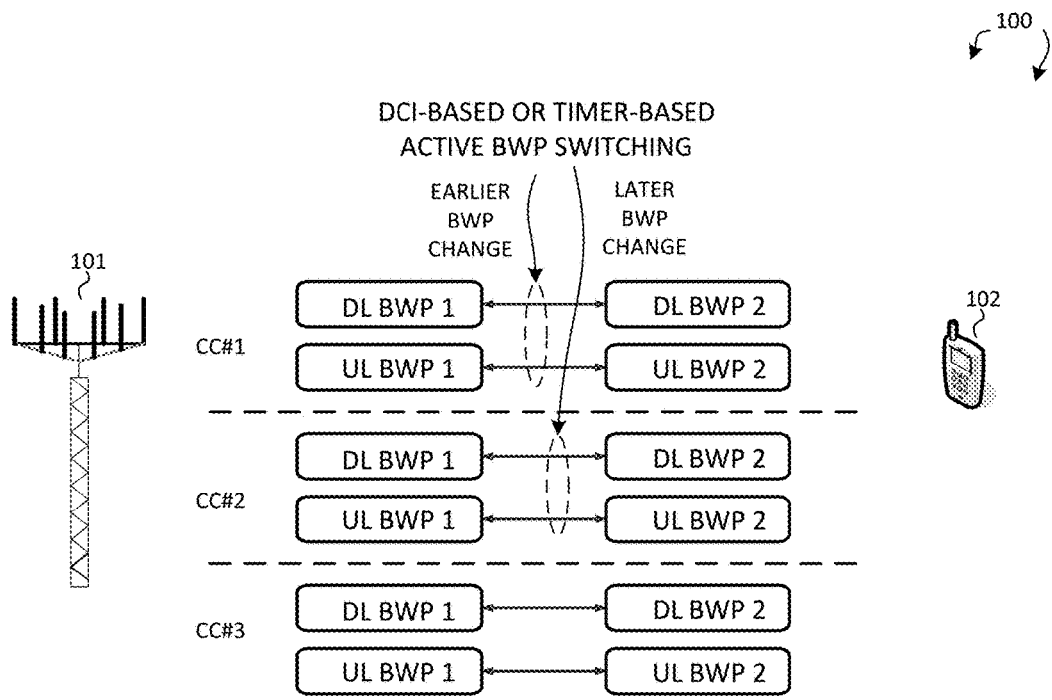
FIG. 1 illustrates a wireless communications system supporting active bandwidth part (BWP) switching in carrier aggregation in accordance with a novel aspect.

FIG. 1 illustrates a wireless communications system 100 supporting active bandwidth part (BWP) switching that avoids long switching delay and interruption time in carrier aggregation (CA) in accordance with a novel aspect. 5G new radio (NR) mobile communication network 100 comprises a base station BS/gNB 101 and a user equipment UE 102. When there is a downlink packet to be sent from gNodeB to UE, each UE gets a downlink assignment, e.g., a set of radio resources in a physical downlink shared channel (PDSCH). When a UE needs to send a packet to gNodeB in the uplink, the UE gets a grant from the gNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including HARQ ACK/NACK, CQI, MIMO feedback, scheduling requests is carried by a physical uplink control channel (PUCCH) or PUSCH if the UE has data or RRC signaling.

To save UE power consumption, multiplex UEs using different bandwidths or numerologies (e.g. cyclic prefix and subcarrier spacing) and enable efficient spectrum utilization over a wide bandwidth, 5G NR introduces the concept of bandwidth part (BWP). Usage scenarios of BWP operation includes the following: 1) enabling reduced UE bandwidth capability within a wideband carrier; 2) enabling reduced UE power energy consumption by bandwidth adaptation; 3) enabling UE using different numerologies in FDM within a wideband carrier. For each UE-specific serving cell corresponding to a component carrier (CC) and a gNB, one or more DL BWPs and one or more UL BWPs can be configured by dedicated RRC for a UE. Under carrier aggregation (CA), each UE per serving cell can be configured by the network with several DL BWPs and UL BWPs, and UE is required to use at most one DL (or UL) BWP for radio signal reception (or transmission) at a given time for a serving cell except when the serving cell is configured with supplemental uplink (SUL), in which case UE is required to use at most one UL BWP for radio signal transmission on each UL carrier. The DL BWP (or UL) BWP which is being used by the UE for radio signal reception (or transmission) is called active DL (or UL) BWP. For each UE, there is at most one active DL (or UL) BWP at a given time for a serving cell except when the serving cell is configured with supplemental uplink (SUL), in which case UE is required to use at most one UL BWP for radio signal transmission on each UL carrier. There is an initial active DL (or UL) BWP to be used by a UE for radio signal reception (or transmission) for a serving cell until the UE is explicitly (re)configured with BWPs during or after RRC connection is established and is indicated to switch to one of the (re)configured DL (or UL) BWPs. As a result, power consumption to monitor the downlink can be reduced because UE is only required to monitoring the smaller frequency range of the active DL BWP.

A BWP consists of a continuous range of physical resource blocks (PRB) in frequency domain and whose occupied bandwidth is the subset of the bandwidth of the associated carrier. That is, the bandwidth of a BWP in a carrier is the subset of the carrier bandwidth, and the bandwidth size ranges from the SS block bandwidth to the maximal bandwidth capability supported by a UE in a component carrier. A BWP may or may not contain a synchronization signal (SS) block. Reserved resources can be configured within a BWP. For a connected-mode UE, one or multiple BWP configurations for each component carrier can be semi-statically signaled to the UE and the configuration parameters at least include: numerology (i.e., CP type, subcarrier spacing); frequency location (the offset between BWP and a reference point is implicitly or explicitly indicated to UE) based on common PRB index for a given numerology; bandwidth size (in terms of PRBs); Control Resource Set (CORESET) (required for each BWP configuration in case of single active DL BWP for a given time instant).

For active BWP operation, a UE is only assumed to receive or transmit within the active BWPs using the associated numerology—at least PDSCH and PDCCH for DL and PUCCH and PUSCH for UL. UE expects at least one DL BWP and UL BWP being active among the set of configured BWPs for a given time instant. In case of single active DL BWP for a given time instant in a component carrier, a UE can assume that PDSCH and corresponding PDCCH are transmitted within the same BWP if PDSCH transmission starts no later than K symbols after the end of the PDCCH transmission. In case of PDSCH transmission starts more than K symbols after the end of the corresponding PDCCH, PDCCH and PDSCH may be transmitted in different BWPs. The activation/deactivation of BWP can be done by dedicated RRC signaling, by DCI scheduling with explicit indication, or by a timer for a UE to switch is active DL BWP to a default DL BWP, e.g., the initial active DL BWP.

If the switching delay of more than one active BWP switching overlaps in time domain in the same CC/cell, the switching delay of the earlier active BWP switching may be extended due to the later active BWP switching. This is because a UE follows the latest active BWP switching indication and reprocesses all related settings for the active BWP switching. There are three types of active BWP switching: DCI-based DL, DCI-based UL, and timer-based. Extended switching delay of an earlier active BWP switching will occur due to a later active BWP switching if a BWP inactivity timer for the cell is configured to be shorter than the switching delay of the earlier active BWP switching. Therefore, to solve this issue, UE can restart the BWP inactivity timer if the BWP inactivity timer expires within the switching delay of an earlier active BWP switching.

Under carrier aggregation, if the switching delay of more than one active BWP switching involving bandwidth and frequency location change overlaps in time domain across CCs/cells, the switching delay of an earlier active BWP switching in one cell may be extended due to the UE's reprocessing of RF setting update triggered by a later active BWP switching in another cell because the processing of RF setting update for an active BWP switching involving bandwidth and frequency location change has to consider the RF settings of all activated CCs/cells. It is observed that if the starting time of a later active BWP switching in one cell falls within the switching delay of an earlier active BWP switching in another cell, then it introduces either longer switching delay of the earlier active BWP switching than the time offset indicated in the active BWP switching DCI or multiple interruptions within a short time period in other cells.

In accordance with one novel aspect, to avoid longer switching delay and interruptions, the starting time of the later active BWP switching (e.g., over CC #2) should fall outside the switching delay of the earlier active BWP switching (e.g., over CC #1). If the later active BWP switching is DCI-based, then the network should schedule the later active BWP switching over CC #2 outside the switching delay of the earlier active BWP switching over CC #1. If the later active BWP switching is timer-based, then the UE should not perform the later active BWP switching over CC #2 until the earlier active BWP switching over CC #1 is completed.

Figure 2:
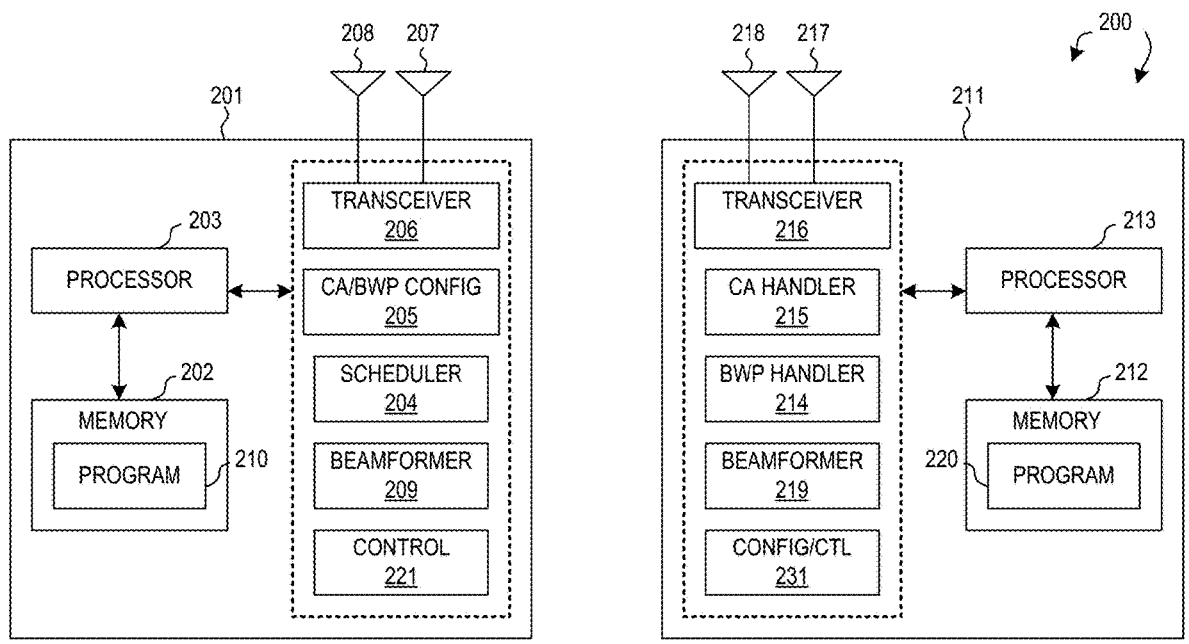
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201. Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a CA and BWP configuration circuit 205, a scheduler 204, a beamforming circuit 209, and a control circuit 221. Wireless device 211 is a user equipment that includes a CA handling circuit 215, a BWP handling circuit 214, a beamforming circuit 219, and a CA/BWP configuration and control circuit 231. The different functional modules and circuits can be implemented and configured by software, firmware, hardware, and any combination thereof. The function modules and circuits, when executed by the processors 203 and 213 (e.g., via executing program codes 210 and 220), allow BS 201 and UE 211 to perform embodiments of the present invention accordingly.

In one example, BS 201 provides CA and BWP configuration for CA/BWP activation and switching for UE 211 via CA and BWP configuration circuit 205. BS 201 schedules control and data transmission via scheduler 204. BS 201 performs beamforming for directional communication via beamforming circuit 209, and provides other control information to UE 211 via controller 221. UE 211 performs carrier aggregation functionalities via CA handling circuit 215, performs BWP functionalities via BWP handling circuit 214, and performs beamforming for direction communication via beamforming circuit 219. UE 211 handles CA and BWP configuration for CA/BWP activation and switching via configuration and control circuit 231. UE 211 determines whether to perform a later scheduled active BWP switching in one cell based on whether such BWP switching will cause longer switching delay of an earlier active BWP switching in another cell and multiple interruptions, and whether the earlier active BWP switching in another cell has been completed.

Figure 3:
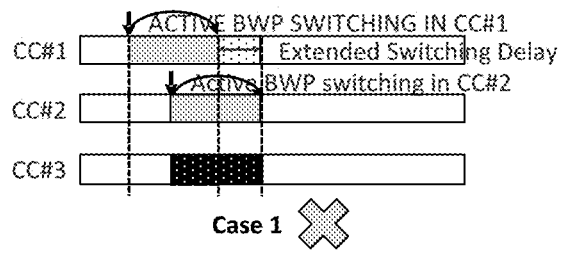
FIG. 3 illustrates multiple active BWP switching over different component carriers (CCs) having different BWP switching delays and causing interruption times in other CCs in a wireless communication system.
Figure 3:
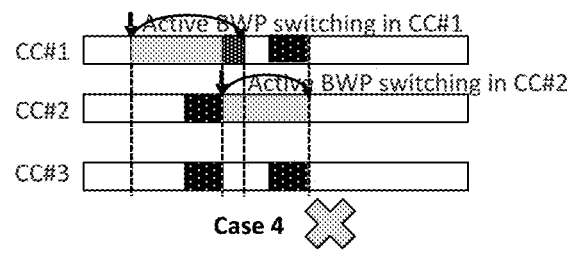
Figure 3:
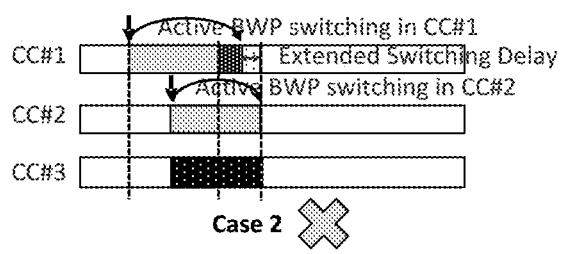
Figure 3:
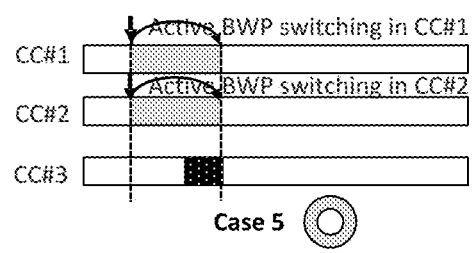
Figure 3:
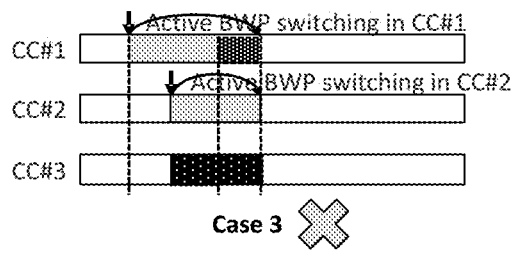
Figure 3:
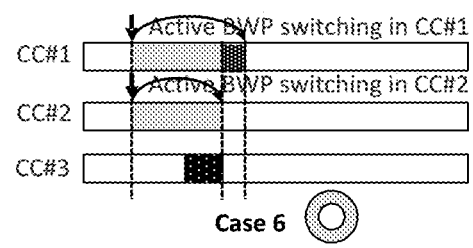

FIG. 3 illustrates multiple active BWP switching over different component carriers (CCs) having different BWP switching delays and causing interruption times in other CCs in a wireless communication system. Under carrier aggregation, if the switching delay of more than one active BWP switching involving bandwidth and frequency location change overlaps in time domain across CCs/cells, the switching delay of an earlier active BWP switching in one cell may be extended due to the UE's reprocessing of RF setting update triggered by a later active BWP switching in another cell because the processing of RF setting update for an active BWP switching involving bandwidth and frequency location change has to consider the RF settings of all activated cells. In the example if FIG. 3, two active BWP switching in different cells (e.g., CC #1 and CC #2) are started and it's assumed that the interruption in other cells lies within the minimal active BWP switching delay as defined in 3GPP specification TS38.101.

In Cases 1, 2, 3 & 4 of FIG. 3, the starting time of a later active BWP switching in one cell (CC #2) falls within the switching delay of an earlier active BWP switching in another cell (CC #1). As a result, for cases 1 and 2, the later active BWP switching in CC #2 introduces longer switching delay of the earlier active BWP switching than the time offset indicated in the active BWP switching DCI, as depicted as the extended switching delay for CC #1. For cases 1, 2, 3 and 4, the later active BWP switching in CC #2 introduces multiple interruptions within a short time period in other cells, as depicted as the interruption times for CC #1, CC #2 and CC #3. Thus, it is observed that the starting time of the later active BWP switching in CC #2 should not fall within the switching delay of the earlier active BWP switching in CC #1.

In Cases 5 & 6 of FIG. 3, the starting time of two active BWP switching aligns with each other so there is no extended switching time and the interruptions in other cells can align. Therefore, it would be better to exclude Case 1, 2, 3 & 4 of FIG. 3 to avoid longer switching delay than the time offset indicated in active BWP switching DCI and multiple interruptions within a short time period in other cells. In general, there are two possible methods to exclude Case 1, 2, 3 & 4 of FIG. 3: 1) defined a UE behavior to avoid such case when it happens; and 2) define such case as an error case that should be avoided by the network.

Figure 4:
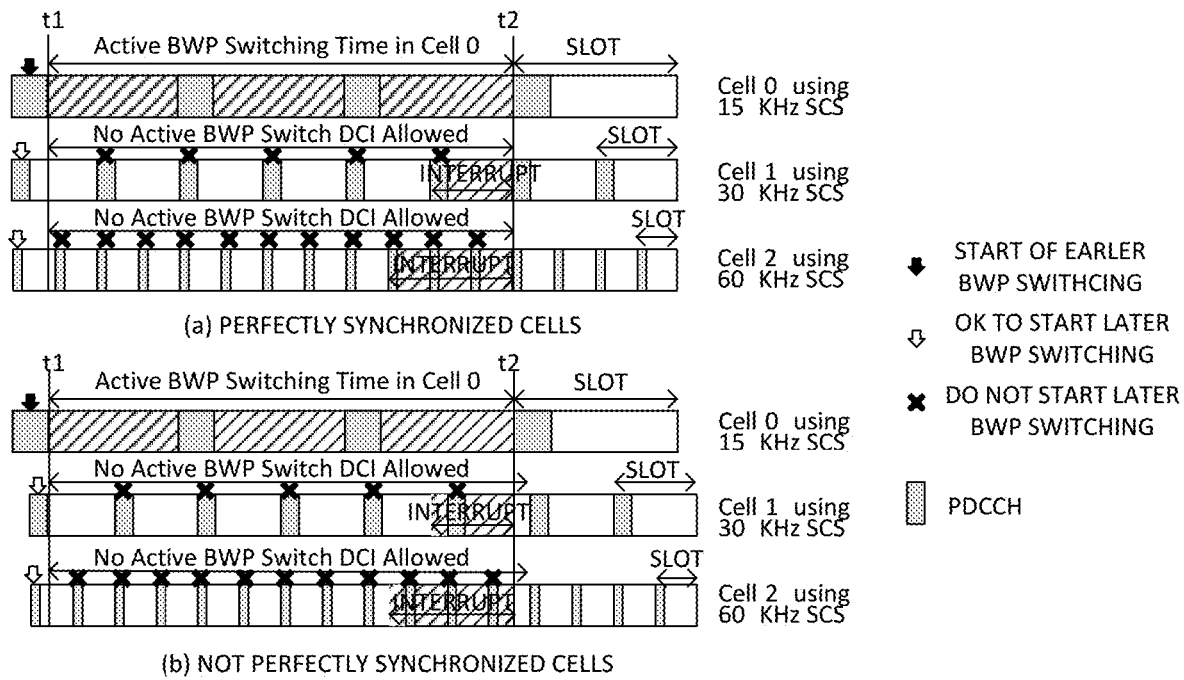
FIG. 4 illustrates DCI-based active BWP switching first happens in a cell with smaller subcarrier spacing (SCS) in carrier aggregation.

FIG. 4 illustrates DCI-based active BWP switching first happens in a cell with smaller subcarrier spacing (SCS) in carrier aggregation. In the example of FIG. 4, the UE is configured with three different cells: Cell 0 using 15 KHz SCS, Cell 1 using 30 KHz SCS, and Cell 2 using 60 KHz SCS. In FIG. 4(a), the three cells are perfectly synchronized. In FIG. 4(b), the three cells are not perfectly synchronized. The first active BWP switching is triggered in Cell 0. During the active BWP switching time in Cell 0 (e.g., the switching delay from time t1 to time t2), no later active BWP switching is allowed in Cell 1 and Cell 2. Note that the first active BWP switching is triggered by a DCI in a PDCCH over Cell 0. During the switching delay, UE is not required to transmit or receive data in Cell 0 during a time duration from the slot where the UE receives the PDCCH that includes the DCI in Cell 0 until the beginning of a slot indicated by the slot offset value of the time domain resource assignment field in the DCI. As a result, it is not allowed to start a later active BWP switching for Cell 1 or Cell 2 if the start time falls within the active BWP switching time of Cell 0. However, for Cell 1 and Cell 2, simultaneous active BWP switching can be started in the first slot of a set of slots that overlaps with the active BWP switching time of cell 0. This way, the starting time of the active BWP switching can align with each other so there is no extended switching delay and the different interruptions in other cells can align as well.

Figure 5:
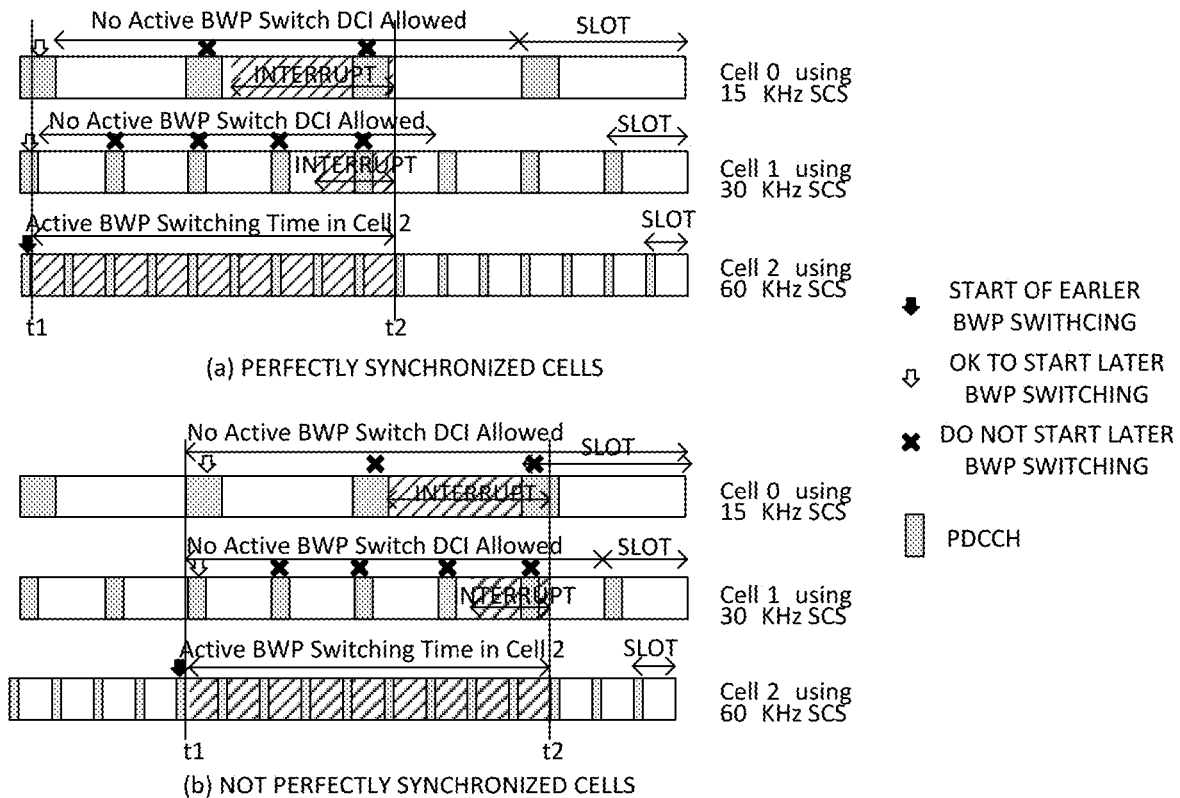
FIG. 5 illustrates DCI-based active BWP switching first happens in a cell with larger subcarrier spacing (SCS) in carrier aggregation.

FIG. 5 illustrates DCI-based active BWP switching first happens in a cell with larger subcarrier spacing (SCS) in carrier aggregation. In the example of FIG. 5, the UE is configured with three different cells: Cell 0 using 15 KHz SCS, Cell 1 using 30 KHz SCS, and Cell 2 using 60 KHz SCS. In FIG. 5(a), the three cells are perfectly synchronized. In FIG. 5(b), the three cells are not perfectly synchronized. The first active BWP switching is triggered in Cell 2. During the active BWP switching time in Cell 2 (e.g., the switching delay from time t1 to time t2), no later active BWP switching is allowed in Cell 0 and Cell 1. Note that the first active BWP switching is triggered by a DCI in a PDCCH over Cell 2. During the switching delay, UE is not required to transmit or receive data in Cell 2 during a time duration from the slot where the UE receives the PDCCH that includes the DCI in Cell 2 until the beginning of a slot indicated by the slot offset value of the time domain resource assignment field in the DCI. As a result, it is not allowed to start a later active BWP switching for Cell 0 or Cell 1 if the start time falls within the active BWP switching time of Cell 2. However, for Cell 0 and Cell 1, simultaneous active BWP switching can be started in the first slot of a set of slots that overlaps with the active BWP switching time of cell 2. This way, the starting time of the active BWP switching can align with each other so there is no extended switching delay and the different interruptions in other cells can align as well.

Figure 6:
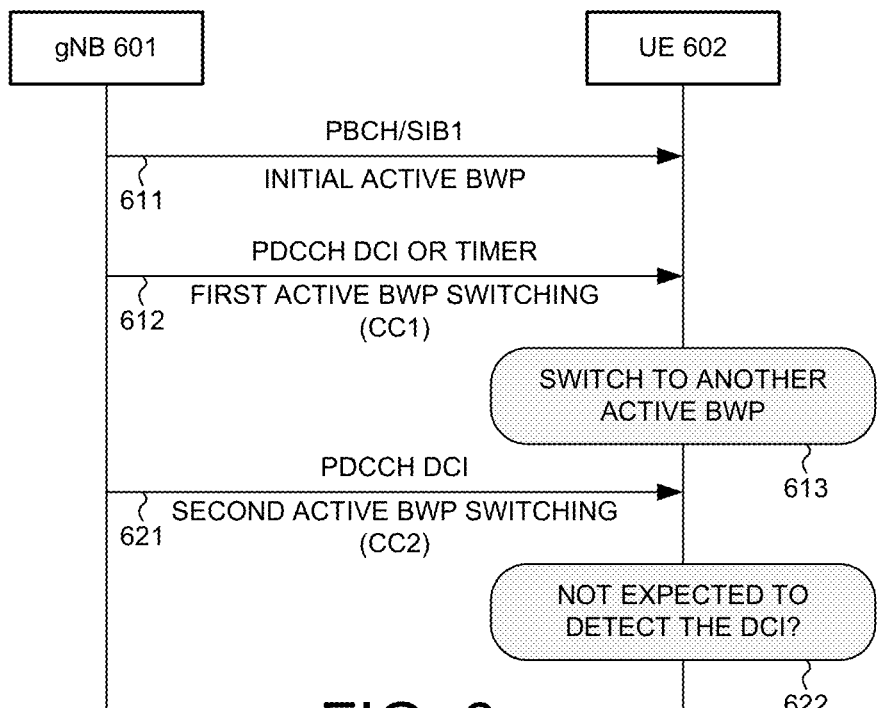
FIG. 6 illustrates a sequence flow between a base station and a user equipment for avoiding longer BWP switching delay and interruption time caused by DCI-based BWP switching under CA.

FIG. 6 illustrates a sequence flow between a base station and a user equipment for avoiding longer BWP switching delay and interruption time caused by DCI-based BWP switching under CA. In step 611, UE 602 receives configuration from gNB 601, e.g., from a physical broadcast channel (PBCH)/SIB1. UE 602 is configured with carrier aggregation, and each CC is configured with multiple DL and UL BWPs, and UE 602 operates in an active DL BWP and an active UL BWP. In step 612, UE 602 detects a first active BWP switching trigger for a first cell (CC1). For example, UE 602 detects a DCI format 1_1 or DCI format 0_1 over a PDCCH indicating an active DL BWP change or an active UL BWP change for CC1. Alternatively, UE 602 detects that a BWP inactivity timer for the first cell (CC1) expires. As a result, in step 613, UE 602 performs an active BWP switching and changes to another active BWP in CC1. UE 602 requires a BWP switching delay for the active BWP change, during which UE 602 is not required to transmit or receive data over CC1. Note that for DCI-based BWP switching, the DCI (same or cross carrier scheduling) can be in the same or a different CC where BWP switching happens. Further, the time duration of the switching delay is indicated in the DCI and it includes the minimal BWP switching delay required by a UE plus additional switching delay due to the gNB's restriction, e.g. DL/UL configuration in a TDD carrier, gNB processing time for the scheduled data, gNB scheduling algorithm's decision.

As explained earlier, in order to avoid longer BWP switching delay in CC1 and multiple interruptions in other cells, UE should not be scheduled with another later active BWP switching in another cell during the switching time of the earlier active BWP switching in CC1. In other words, UE 602 is not expected to receive a DCI format 1_1 or DCI format 0_1 over a PDCCH indicating a scheduled active BWP change for a second cell (CC2) in a slot other than the first slot of a set of slots of CC2 that overlaps with a time duration where the UE is not required to receive or transmit for an active BWP change in the first cell (CC1). Although UE 602 is not expected to detect such DCI, because the network is not supposed to avoid the later scheduled BWP change. Nonetheless, in step 621, if UE 602 indeed detects such DCI, then in step 622, UE 602 either ignores the DCI or drops the DCI as an error.

Figure 7:
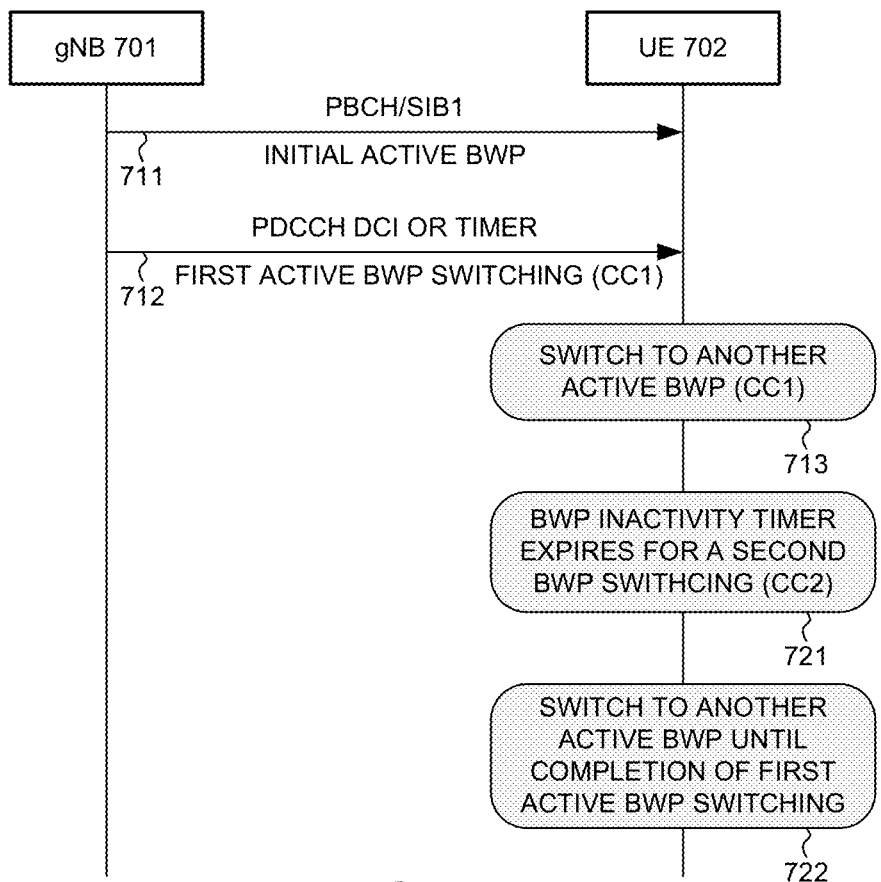
FIG. 7 illustrates a sequence flow between a base station and a user equipment for avoiding longer BWP switching delay and interruption time caused by timer-based BWP switching under CA.

FIG. 7 illustrates a sequence flow between a base station and a user equipment for avoiding longer BWP switching delay and interruption time caused by timer-based BWP switching under CA. In step 711, UE 702 receives configuration from gNB 701, e.g., from a physical broadcast channel (PBCH)/SIB1. UE 702 is configured with carrier aggregation, and each CC is configured with multiple DL and UL BWPs, and UE 702 operates in an active DL BWP and an active UL BWP. In step 712, UE 702 detects a first active BWP switching trigger for a first cell (CC1). For example, UE 702 detects a DCI format 1_1 or DCI format 0_1 over a PDCCH indicating an active DL BWP change or an active UL BWP change for CC1. Alternatively, UE 702 detects that a BWP inactivity timer for the first cell (CC1) expires. As a result, in step 713, UE 702 performs an active BWP switching and changes to another active BWP in CC1. UE 702 requires a BWP switching delay for the active BWP change, during which UE 702 is not required to transmit or receive data over CC1.

In step 721, UE 702 detects that a BWP inactivity timer for a second cell (CC2) expires. The expiration would have triggered another active BWP switching in CC2. However, since the timer expires during the switching time of the earlier active BWP switching in CC1, UE 702 delays the timer-based active BWP switching in CC2 till the completion of the earlier active BWP switching in CC1. In step 722, UE 702 determines whether the active BWP switching in CC1 is completed or not. If no, then UE 702 does nothing. If yes, then UE 702 performs the active BWP switching in CC2. By introducing an additional condition for a timer-based active BWP switching, UE 702 makes sure that the later active BWP switching does not cause longer switching delay of an earlier active BWP switching, or cause more interruptions for other cells.

Figure 8:
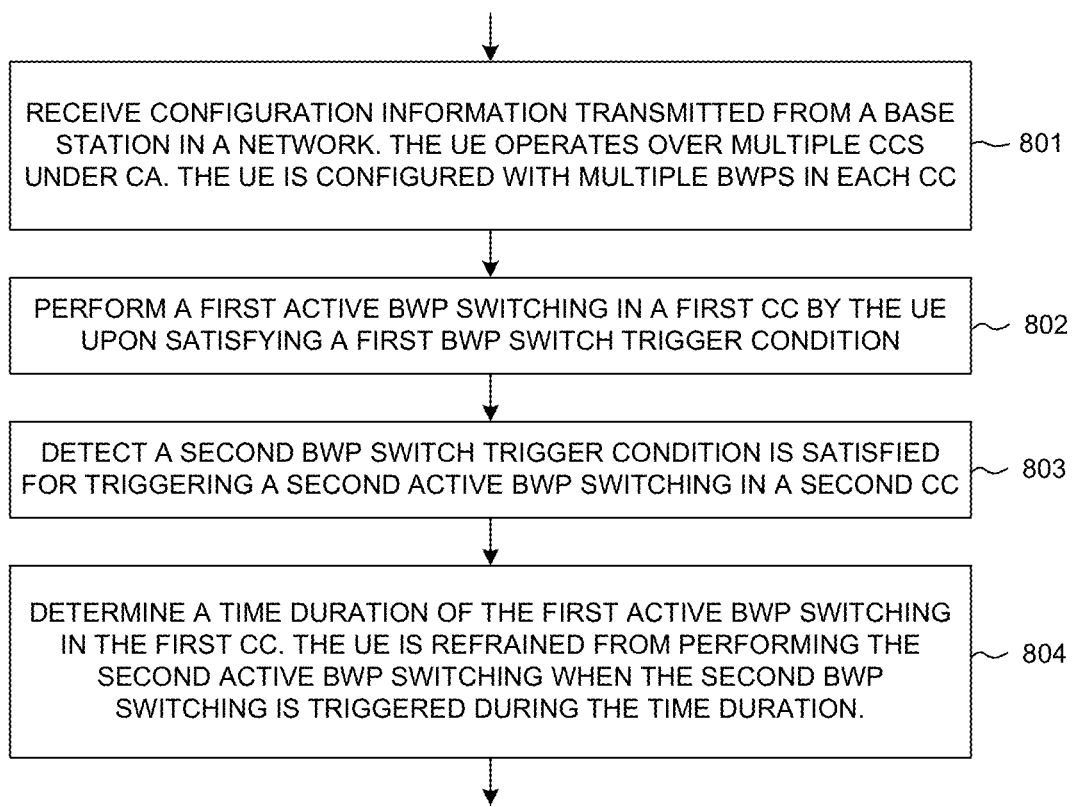
FIG. 8 is a flow chart of a method for avoiding longer BWP switching delay and interruption time under CA in accordance with one novel aspect.

FIG. 8 is a flow chart of a method of avoiding longer BWP switching delay and interruption time under CA in accordance with one novel aspect. In step 801, a UE receives configuration information transmitted from a base station in a wireless communications network. The UE operates over multiple component carriers (CCs) under carrier aggregation, and the UE is configured with multiple bandwidth parts (BWPs) in each CC. In step 802, the UE performs a first active BWP switching in a first CC by the UE upon satisfying a first BWP switch trigger condition. In step 803, the UE detects a second BWP switch trigger condition is satisfied for triggering a second active BWP switching in a second CC. In step 804, the UE determines a time duration of the first active BWP switching in the first CC, wherein the UE is refrained from performing the second active BWP switching when the second BWP switching is triggered during the time duration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving configuration information transmitted from a base station by a user equipment (UE) in a wireless communications network, wherein the UE operates over multiple component carriers (CCs) under carrier aggregation, and wherein the UE is configured with multiple bandwidth parts (BWPs) in each CC;
performing a first active BWP switching in a first CC by the UE upon satisfying a first BWP switch trigger condition;
detecting a second BWP switch trigger condition is satisfied for triggering a second active BWP switching in a second CC; and
determining a time duration of a switching delay of the first active BWP switching in the first CC, wherein the UE is refrained from performing the second active BWP switching if the second BWP switching is triggered during the time duration.

2. The method of claim 1, wherein the first BWP switch trigger condition is satisfied by receiving a first downlink control information (DCI) for indicating the first active BWP switching for the first CC.

3. The method of claim 1, wherein the first BWP switch trigger condition is satisfied by detecting that a first BWP inactivity timer for the first CC is expired.

4. The method of claim 1, wherein the second BWP switch trigger condition is satisfied by receiving a second downlink control information (DCI) in a slot for indicating the second active BWP switching for the second CC.

5. The method of claim 4, wherein the UE ignores the second DCI or drops the second DCI as an error if the slot overlaps with the time duration.

6. The method of claim 4, wherein the UE is allowed to perform the second active BWP switching if the slot is a first slot of a set of slots that overlap with the time duration.

7. The method of claim 1, wherein the second BWP switch condition is satisfied by detecting that a second BWP inactivity timer for the second CC is expired.

8. The method of claim 7, wherein the UE waits until the first active BWP switching to be completed and then performs the second active BWP switching.

9. The method of claim 1, wherein the time duration determined in a DCI indicating active BWP switching includes a minimal BWP switching delay required by the UE plus an additional switching delay due to scheduling constraints of the base station.

10. The method of claim 1, wherein the UE is not required to transmit or receive data over the first CC during the switching delay.

11. A User Equipment (UE) comprising:
a receiver that receives configuration information transmitted from a base station in a wireless communications network, wherein the UE operates over multiple component carriers (CCs) under carrier aggregation, and wherein the UE is configured with multiple bandwidth parts (BWPs) in each CC;
a BWP handling circuit that performs a first active BWP switching in a first CC by the UE upon satisfying a first BWP switch trigger condition; and
a control circuit that detects a second BWP switch trigger condition is satisfied for triggering a second active BWP switching in a second CC, wherein the UE determines a time duration of the first active BWP switching in the first CC, wherein the UE is refrained from performing the second active BWP switching when the second BWP switching is triggered during the time duration.

12. The UE of claim 11, wherein the first BWP switch trigger condition is satisfied by receiving a first downlink control information (DCI) for indicating the first active BWP switching for the first CC.

13. The UE of claim 11, wherein the first BWP switch trigger condition is satisfied by detecting that a first BWP inactivity timer for the first CC is expired.

14. The UE of claim 11, wherein the second BWP switch trigger condition is satisfied by receiving a second downlink control information (DCI) in a slot for indicating the second active BWP switching for the second CC.

15. The UE of claim 14, wherein the UE ignores the second DCI or drops the second DCI as an error if the slot overlaps with the time duration.

16. The UE of claim 14, wherein the UE is allowed to perform the second active BWP switching if the slot is a first slot of a set of slots that overlap with the time duration.

17. The UE of claim 11, wherein the second BWP switch condition is satisfied by detecting that a second BWP inactivity timer for the second CC is expired.

18. The UE of claim 17, wherein the UE waits until the first active BWP switching to be completed and then performs the second active BWP switching.

19. The UE of claim 11, wherein the time duration determined in a DCI indicating active BWP switching includes a minimal BWP switching delay required by the UE plus an additional switching delay due to scheduling constraints of the base station.

20. The UE of claim 11, wherein the UE is not required to transmit or receive data over the first CC during the switching delay.

* * * * *